United States Patent [19]

Sticht

[11] Patent Number: 4,492,297
[45] Date of Patent: Jan. 8, 1985

[54] ASSEMBLY LINE ARRANGEMENT

[76] Inventor: Walter Sticht, Wankhamerstrasse 8, A-4800 Attnang-Puchheim, Austria

[21] Appl. No.: 143,049

[22] Filed: Apr. 23, 1980

Related U.S. Application Data

[63] Continuation of Ser. No. 891,294, Mar. 29, 1978, abandoned.

[30] Foreign Application Priority Data

Dec. 15, 1977 [AT] Austria ............................ 8956/77

[51] Int. Cl.³ ............................................ B65G 21/20
[52] U.S. Cl. .................................... 198/345; 198/472
[58] Field of Search ............... 198/339, 345, 472, 580, 198/624, 648, 583, 722, 719, 781, 841

[56] References Cited

U.S. PATENT DOCUMENTS

| | | | |
|---|---|---|---|
| 2,712,377 | 7/1955 | Eggleston | 198/781 |
| 3,049,214 | 8/1962 | Cormia et al. | 198/472 |
| 3,527,087 | 9/1970 | Converse et al. | 198/339 |
| 3,610,391 | 10/1971 | Beck | 198/722 |
| 3,800,938 | 4/1974 | Stone | 198/841 |
| 3,888,341 | 3/1975 | Konkal et al. | 198/345 |
| 4,014,428 | 3/1977 | Ossbahr | 198/339 |
| 4,046,248 | 9/1977 | Goffredo et al. | 198/583 |

FOREIGN PATENT DOCUMENTS

2241477  3/1975  Fed. Rep. of Germany ...... 198/339

Primary Examiner—Joseph E. Valenza
Attorney, Agent, or Firm—Kurt Kelman

[57] ABSTRACT

An assembly line comprises a succession of replaceable in-line modules each having a conveyor section and the conveyor sections of successive modules being arranged in series to constitute a conveying path. The conveyor section of each module has a succession of areas each of which accommodates a workpiece carrier and at least one of which is a processing area for working on a respective workpiece held on the carrier. Each conveyor section includes slideways for vertically and laterally guiding the successive workpiece carriers along the conveying path and a series of drive rollers spaced along, and separate from the slideways for individually driving each carrier independently through the conveyor section. The slideways of the adjoining modules form a continuous planar conveying path along the entire assembly line for securely holding the successive workpiece carriers.

13 Claims, 6 Drawing Figures

ASSEMBLY LINE ARRANGEMENT

This is a continuation of my copending U.S. application Ser. No. 891,294, filed Mar. 29, 1978, now abandoned.

This invention relates to an assembly line arrangement comprising working stations which are disposed along a conveyor path and adapted to receive a succession of workpieces, which are preferably held by workpiece carriers, fed by driven conveyor means.

Such assembly line arrangements are used either to process a given workpiece in a plurality of steps or to assemble one or more workpieces with a primary workpiece so as to provide a pre-assembly or complete assembly. Assembling and processing steps may be carried out in alternation in a preselected sequence.

A preferred field of application for assembly line arrangements has been mentioned hereinbefore. The generic term "assembly arrangement" includes also lines for packaging complicated packages which are composed of a plurality of different parts, as well as packages in which one or more components to be packaged in a specific arrangement are fed to a primary package element, such as a tray, and additional package parts are then affixed. In manufacturing plants, the processing and/or assembling line may be directly succeeded by a packaging line.

In known assembly line arrangements of the kind described, a single belt conveyor extends throughout the length of the production line and the several stations are disposed along this line. There are production lines which comprise belt conveyors including a single belt or two parallel belts and in which the workpieces themselves or workpieces held on workpiece carriers are placed on the belt or belts. It is also known to connect workpiece carriers in an endless chain forming a conveyor belt. Production lines comprising separate conveyor belts and reusable workpiece carriers require means for returning the workpiece carriers to the beginning of the line. The workpieces are intermittently moved from station to station and are processed in each station. The cycle times in the several stations should be equal, as far as possible, because the overall feed rate and the residence time of the workpieces in the several stations must be determined in dependence on, i.e. synchronized with, the longest station cycle time. Longer cycle times in a given station cannot be compensated by an increase of the speed of conveyance between that station and the next because the speed of conveyance remains the same throughout the production line. Particular difficulties will arise in connection with production lines which comprise manually operated stations as well as automatic assembling stations. In that case, the station cycle time will depend on the average manual working time. A great disadvantage resides in the fact that the working speed of an operator usually varies because he could work at certain times much faster than corresponds to the predetermined cycle time whereas during a slump he can hardly complete the work within the cycle time. For these reasons, work at a production line within predetermined cycle times imposes a severe nervous strain on the operators and is avoided as far as possible.

Whether the workpieces rest on a conveyor belt or are held by a workpiece carrier or pallet, a special problem resides in the aligning of the workpiece in the processing station. Specifically, the workpieces cannot be processed in the stations from the top and bottom at the same time. When a processing at the bottom is also required, separate turning stations are required and the bottom must also be processed from above. Whereas a conveyor belt may move continuously at a low speed and the processing stations may be provided with means for holding the workpieces in position in frictional contact with the moving conveyor belt, such arrangements cannot decisively improve the problems which arise. Production lines of known type have disadvantages also in other respects and generally are adapted only for specific uses. The dimensions of the production line and the locations of the several stations at that line must be exactly determined at the planning stage. For this reason, the installation of such production lines will not be economical unless specific components, which should be as closely identical to each other as possible, are to be manufactured in very large quantities. Any alteration of even a single processing step will involve a stoppage of the entire production. Besides, it is impossible or very difficult to use such production lines for the simultaneous manufacture of similar components which require, for example, nine processing steps that are equal for all components and a tenth processing step which is different for the several components. Obviously that different processing step may not always be the last step. By way of example, reference may be made to internal combustion engines for motor vehicles, comprising identical engine blocks for a given piston displacement and different internal fixtures attached to the engine blocks for different engine powers. In most cases, the motors of the basic type account for about 80% of the total production and the remainder of the total production consists of a plurality of modified types. The known production lines can either be used only to make the basic type or must be considerably altered for the special types, which can then be manufactured in small quantities. The long times required for the alterations result in an inadequate utilization of the existing production capacity.

In spite of the disadvantages and difficulties which have been pointed out, moving assembly lines are still among the most economical methods of production. In view of the high capital expense, a careful management will use that production method only when there is an assurance that a large part of the production capacity can be utilized and that the production can be continued until the assembly line has been amortized.

It is an object of the invention to provide a modular assembly line arrangement which can be altered as regards the production rate and the nature of the several processing steps and in which the station cycle times need not be uniform, i.e. may be non-synchronous, and which can be used for manufacturing different components at the same time in a number of processing and/or assembling steps, some of which differ for different components. Besides, the line should be adaptable to existing space conditions and to the number of operators who are available.

This object is accomplished according to the invention with an assembly line arrangement defining a linear conveying path for successive workpieces or workpiece carriers, which comprises a succession of replaceable working stations. Each in line working station is a module having a conveyor section extending substantially from one end to the other end of the working station, and the conveyor sections of successive working stations are arranged end-to-end in series to constitute the conveying path. The conveyor section of each working station has a succession of areas each of which accommodates a respective workpiece or workpiece carrier and at least one of the successive areas is a processing area for working on the workpiece. Each conveyor section includes guide means for vertically and laterally guiding the successive workpieces or workpiece carriers along the conveying path and discrete drive means spaced along, and separate from, the guide means; the discrete drive means being dimensioned for individually driving each workpiece or workpiece carrier independently through the conveyor section. The guide means of each conveyor section extends substantially to the ends of each working station and is arranged to provide continuous planar conveying path between the working stations and along the entire assembly line arrangement for securely holding the successive workpieces or workpiece carriers.

The stations and their conveyor sections can be arranged in a sequence which depends on requirements. For instance, a manufacture can be initiated in one or two stations, in which a certain part of the processing and/or assembling operations are performed. When the production is to be expanded, stations for additional processing steps in succession to the existing part of the assembly line may be added. It is also possible to provide manual stations along a production line, i.e. assembling stations in which certain assembling operations are carried out manually, and in case of a higher production, these manual stations may be replaced by assembling machines. The work comprising the assembling at the manual stations will be continued without restriction until the assembling machines for the assembly line have been delivered. Upon receipt of the working station module which comprises the assembling machine, that station with its conveyer section is inserted into the existing conveying path or is replaced in that conveying path for a manual station. Because each working station has its own drive control, the conveying speed can be controlled individually and different cycle times in the several stations can be compensated by different speeds of conveyance between the stations. The speed of conveyance from station to station can be varied, as required.

The length of the conveyor section of each working station is a multiple of the length of an individual workpiece or workpiece carrier. As a result, two workpieces can be processed on one station at the same time so that a longer time required for a given processing step can be compensated by a parallel processing of two workpieces, or workpieces or workpiece carriers which have arrived from the preceding station may be temporarily held in a waiting area which precedes the actual processing area. The processing area may be succeeded by another waiting area, in which a processed workpiece is held until it is released for conveyance to the next processing area but does not delay the processing in the same station. In this way, different station cycle times can be compensated by buffer zones. This is a decisive advantage particularly in production lines which comprise a manual station.

The above and other objects, advantages and features of the present invention will become more apparent from the following detailed description of certain now preferred embodiments thereof, taken in conjunction with the accompanying drawing wherein.

Figure 1:
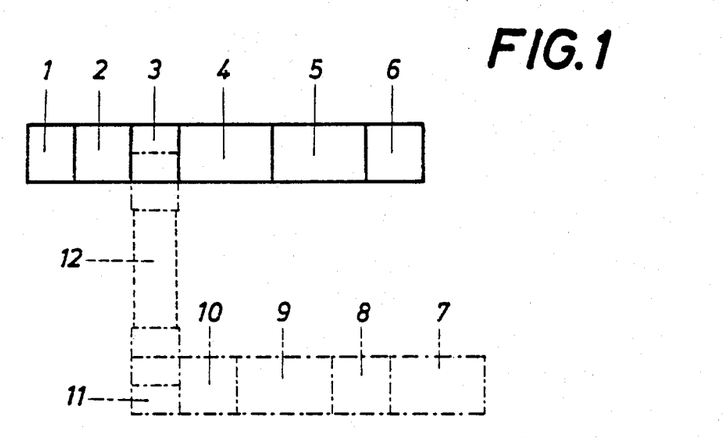
FIG 1 is a top plan view showing an assembly line arrangement in a block diagram.

The assembly line arranged shown in FIG. 1 in full lines consists of six working station modules 1 to 6 defining a linear conveying path for successive workpieces or workpiece carriers, comprising a feeding station 1, a processing station 2 provided with automatically operating tools, a transfer or storage station 3, a manual operating station 4, another manual operating station 5 and a final automatic assembling station 6 provided with automatically operated means for ejecting or removing components. Each station has a conveyor section provided with guides for a workpiece or workpiece carrier and separate and discrete drive means, such as friction rollers, for driving respective workpieces or workpiece carriers. Each station is provided with a separate motor for driving the drive rollers. The speed of each motor is individually controlled and connections to the speed controls of adjacent stations and/or to a central motor speed control are provided for an additional control of the driving speed of each motor and for de-energizing the motor drive means when required. The conveyer section of each station can be coupled to the conveyor section of an adjacent station. The residence times of the components or workpiece carriers in each station can be controlled individually in dependence on the required processing time and from the central control. The driving means associated with the several stations can convey the workpieces or workpiece carriers at different speeds.

Replaceable stations 1 to 6 are interconnected by quick-acting couplings and, particularly if the stations are relatively small, are mounted on a machine bed or another support so that they abut and are aligned with each other. Each of the stations can be removed quickly when this is required, and the remaining stations can then be re-arranged to abut each other, or a station may be removed and replaced by another. Two parallel and preferably juxtaposed conveyor courses may be provided in each station and in that case will be aligned with the conveyor courses of adjacent stations. In that case, stations 6 and 1 will also serve as transfer stations for diverting the workpieces or workpiece carriers from one conveyor course to the other. Processing may be effected in one or both conveyor courses. In the former case, the second conveyor course may be used to return the workpiece carriers to the first station.

Another possible arrangement of a manufacturing plant has been indicated in dotted lines and dash-dot lines in FIG. 1. It is assumed that the workpieces being assembled or processed could travel in stations 4, 5 and 6 at a speed which is much higher than the speed which can be attained in stations 1 and 2 so that stations 4 to 6 are not fully utilized. It is also assumed that it is desired to make a second product which is similar to the product manufactured and/or assembled on assembly line 1 to 6 and has virtually the same overall dimension but requires a larger number of processing steps and the second product is to be subjected in stations 4 to 6 to the same assembling and/or processing operations. Stations 7 to 10 are provided for the preliminary processing of the second product and are included in a separate section of the assembly line. At the end of that section, a transfer station 11 is provided, which deposits the workpieces or the workpiece carriers supporting the workpieces on a transverse conveyor, for example belt conveyor 12 which delivers them to section 3, where they are transferred by a separate transfer device to that section of the first assembly line which includes stations 3 to 6. Stations 1 and 2 may have a relatively low capacity and stations 4 to 6 may be automatically operated stations having a higher capacity. In that case, stations 7 to 11 may be used for the same assembling and processing operations as stations 1 and 2 so that the total output can be increased. Each station module consists of one or two conveyor courses and a superstructure. In a station designed for manual operations, the superstructure may comprise arm rests, toolholders and feeders for workpieces to be assembled. In an automatically operating station, the superstructure comprises the required assembling and/or processing machine or machines with their controls and any feeders for workpieces.

As has been mentioned, a packaging line may be similarly arranged. In that case, package base parts rather than the workpiece carriers are conveyed along the line and the workpieces to be packaged, and covers for them are attached in the several stations.

Figure 2:
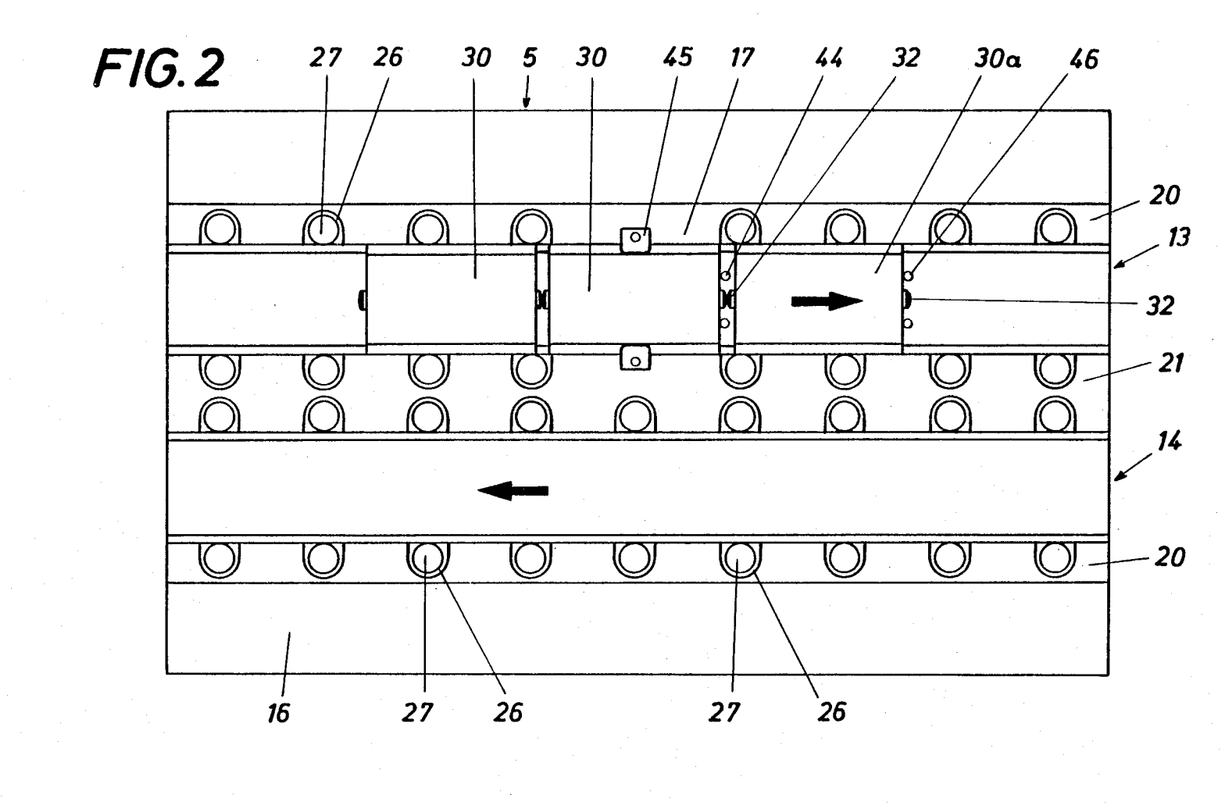
FIG. 2 is a top plan view showing an individual working station, the top portions of the guides having been omitted.
Figure 3:
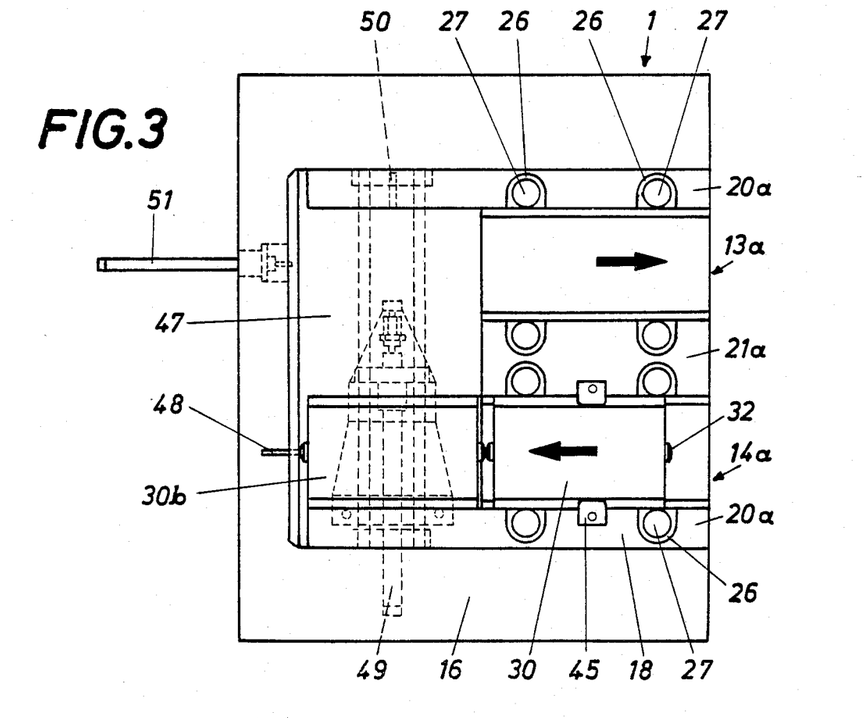
FIG. 3 is a diagrammatic top plan view showing a head and transfer station for use with stations shown in FIG. 2.
Figure 4:
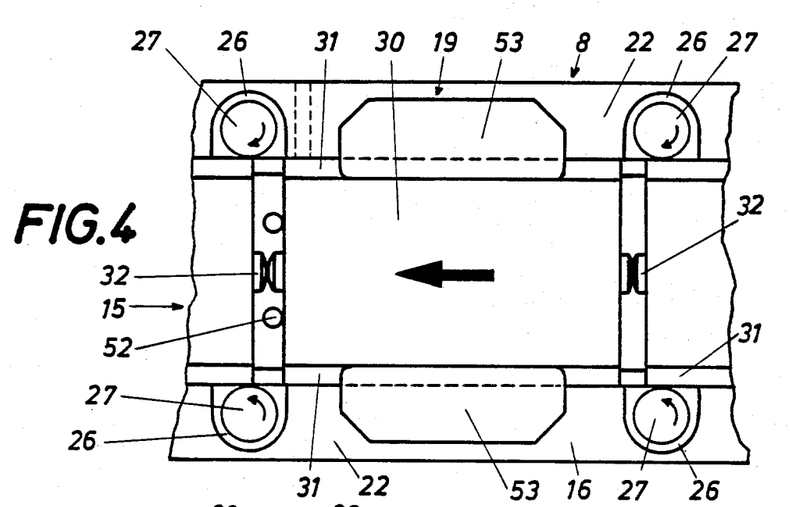
FIG. 4 is a top plan view showing on a larger scale and in detail the processing area of a station provided with assembling or processing machines, the upper portions of the guides and all assembling and processing means having been omitted.

Preferred embodiments of replaceable working stations which may be used in the modular assembly line arrangement of FIG. 1 as stations 1 to 11 are illustrated in FIGS. 2 to 4. Each in-line working station has a conveyor section extending from one end to the other end thereof. The conveyor sections of successive in-line working stations are arranged end-to-end in series to constitute the conveying path. Each conveyor section includes guide means for vertically and laterally guiding the successive workpieces or workpiece carriers along the conveying path and the guide means of the in-line working stations extends to the ends of these working stations. If desired and as shown in FIGS. 2 and 3, the conveyor section of stations 1 and 5 may comprise two parallel courses 13, 14 or 13a, 14a. Only one conveyor course 15 for a conveyance in one direction is required in station 8 (see FIG. 4). A baseplate 16 is provided, which may have apertures adjacent to the conveying path sections 13, 14, 15, 13a, 14a at least at processing or assembling areas 17, 18, 19 so that the workpiece or workpiece carrier is accessible from below.

Figure 6:
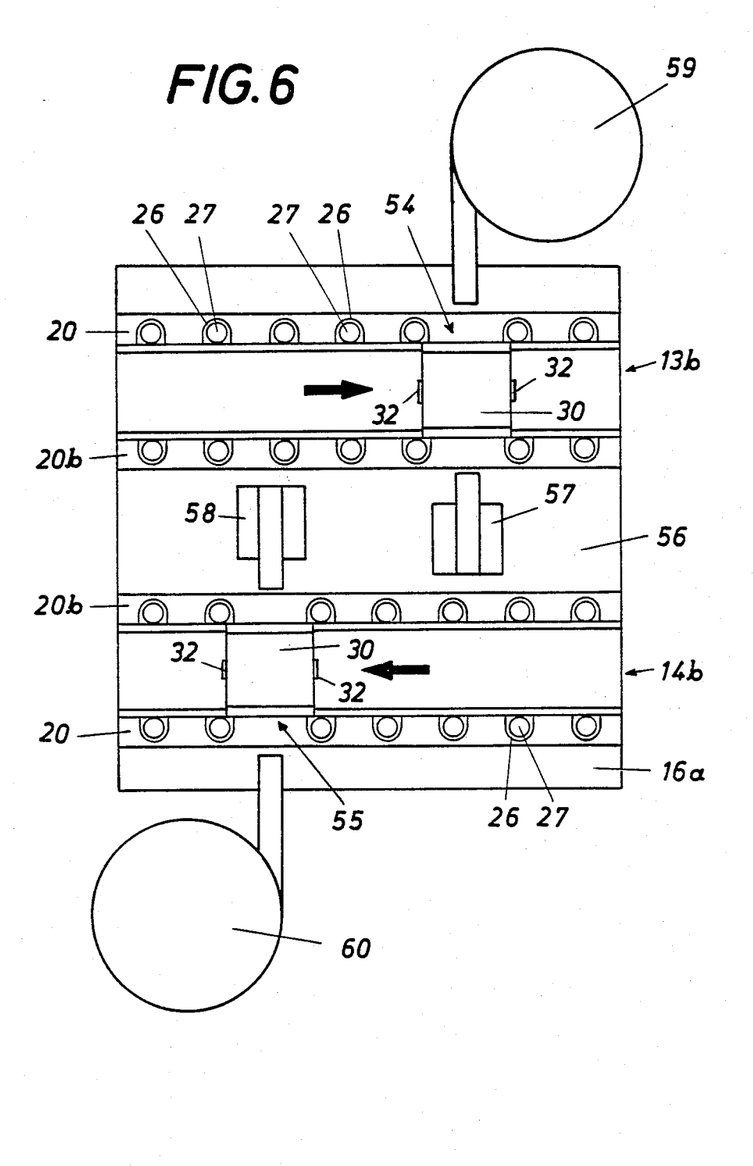
FIG. 6 is a diagrammatic top plan view showing a station which comprises two parallel conveyor sections and in which the processing areas and feeders, assembling or processing machines associated with such processing areas are offset from the longitudinal center of the section and with respect to each other in the direction of conveyance.

In the preferred illustrated embodiments, the workpiece carriers have longitudinal planar portions extending in the direction of the conveying path and the guide means comprises slideways arranged to cooperate with selected longitudinal planar portions, which are laterally extending edges of the workpiece carriers or pallets in the illustrated embodiment. The separate and discrete drive means in the illustrated embodiment are friction rollers mounted for frictional driving engagement with selected ones of the planar portions, which are the laterally extending pallet edges in the illustrated embodiment. As shown, this guiding means and separate drive means arrangement of the preferred embodiment includes backing or guide bars 20, 21, 20a, 21a, 22 mounted on baseplate 16 on both sides of conveyor courses 13, 14, 15, 13a, 14a of the conveyor section. These bars extend from one end of the working station to its other end, as shown in FIGS. 2 and 6, so that the adjoiningly arranged working stations of the assembly line (FIG. 1) form a continuous planar conveying path for securely holding the successive workpieces or workpiece carriers. The bars have an upstanding edge portion 23 on the side which is remote from the conveying path. Low-friction lining 25 is provided on the edge 24 adjacent the conveying path. The bars are formed with semi-circular apertures or recesses 26 which accommodate friction rollers 27. These friction rollers and the recesses are covered by cover plates 28 which extend over lining 25 so that cover plates 28 and lining 25 define guide grooves 29 which are open toward the conveying path and, in the present example, serve to guide workpiece carriers 30. These workpiece carriers have been only diagrammatically indicated by their contours and in practice may consist of two or more parts, e.g., of an outer frame which engages the guide, and an insert which conforms to the workpiece. In any case, the workpiece carriers are provided with guide ribs 31 which extend into the guide grooves 29 and the sides of which are in pressure contact with the friction rollers 27. Buffers 32 are mounted at the ends of the workpiece carriers. There are no friction rollers 27 in processing areas 17 and 19. As a result, these processing areas are not occupied unless a workpiece carrier, which in a waiting position is disposed only in part in the respective processing area, is struck by a succeeding workpiece carrier 30 and is thus pushed fully into the processing area. The rollers on opposite sides of each conveyor section 13, 14, 15, 13a, 14a are driven in opposite senses to impart to the workpiece carriers 30 a feed movement in the directions indicated by the arrows.

Figure 5:
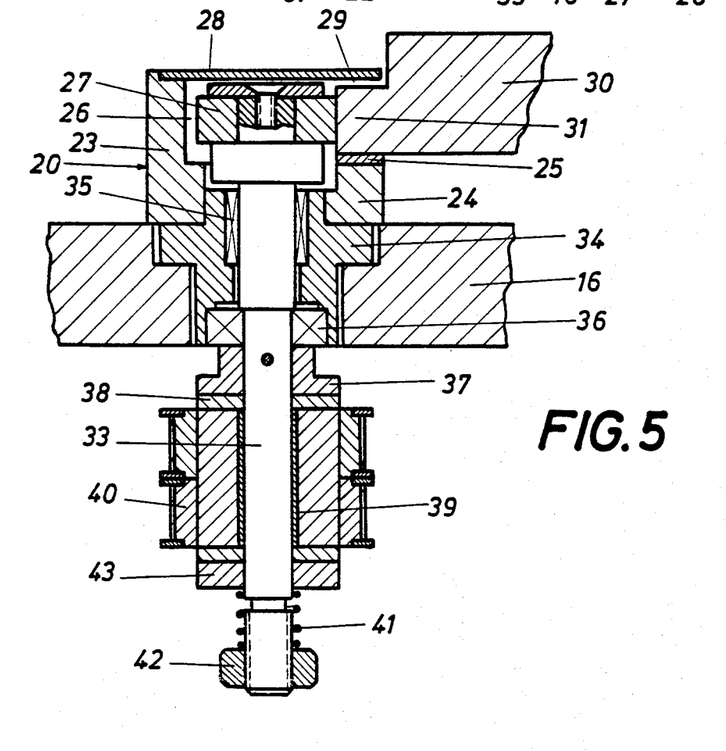
FIG. 5 is a longitudinal sectional view showing one side of a guideway adjacent to a drive roller.

In accordance with FIG. 5, the friction rollers 27 are mounted on upright shafts 33 which are mounted by means of roller bearings 35, 36 in inserts 34 provided in the baseplate 16. A collar 37 is fixed to each shaft and carries friction facing 38. By means of a slidable bushing 39, two toothed belt pulleys 40 connected in a unit are rotatably mounted on each shaft 33. By means of a spring 41 and a pressure plate 43, the pulleys 40 can be forced against the friction facing 38. The initial stress of the spring 41 is adjustable by means of an adjusting nut 42 to select the torque which can be transmitted by the pulleys 40 to the friction roller 27.

A separate adjustable drive motor is associated with each conveyor section and drives a toothed belt which is trained around one pulley 40 on the shaft 33. By means of toothed belts, those shafts which are associated with the friction rollers 27 disposed on the same side of the conveyor path are connected to each other and to the driven toothed belt pulley. A member for reversing the direction of rotation is provided on the other side of the same conveyor path section and the friction rollers 27 on that side are similarly connected. In stations having two conveyor courses, a separate controllable drive motor is associated with each course.

Summarizing the above-described preferred embodiment illustrated herein, the conveyor section of each working station module comprises slideways 24 which cooperate with longitudinal guide ribs 31 of the workpiece carriers 30 and drive means consisting of friction rollers 27 which are in pressure contact with the workpiece carriers and are provided with friction clutches for limiting or adjusting the torque of said rollers. The workpiece carriers may consist of supports for packages or for workpieces themselves. For instance, furniture parts or doors may be processed or finished on suitable production lines without need for separate workpiece carriers. Because the guide is separate from the drive means, the elevation of the workpiece relative to each station remains exactly adjusted by the guide. The longitudinal edges of the workpiece carriers consist of guide ribs which extend into guide grooves open toward each other and covered on top against an ingress of dirt whereas the friction rollers are in pressure contact with the outside surfaces of the guide ribs through spaced apart apertures or recesses at the bottom of the grooves. The conveyance can be facilitated in that at least the lower side face of the groove is provided with a low-friction covering.

In a desirable arrangement, the guides are provided at least in part of their length only adjacent to the longitudinal edges or guide ribs of the workpieces or workpiece carriers so that the components are accessible also at the bottom for being assembled and/or processed.

According to a further feature, a given conveyor section comprises a processing area and waiting or storage areas for workpieces and/or workpiece carriers before and behind the processing area, and a workpiece carrier is adapted to be held in position by retaining means at the processing area. Adjustable clamping members may be provided adjacent the processing area and, in clamping position, may force the workpiece or workpiece carrier against those portions of the slideway which support the workpiece or workpiece carrier from below, or against a processing deck on which the workpiece or workpiece carrier is supported on a larger area than by the slideway. Separate means and aligning aids may be provided to ensure that the workpiece is moved exactly to a predetermined position and can be satisfactorily processed by the machines provided in a given station.

As shown in FIG. 2, the total length of a conveyor section 13 or 14 is a multiple of the length of a workpiece carrier 30 so that a retention or buffer area for receiving workpiece carriers 30 disposed outside the processing area 17 is left free in the section. Extensible stop pins 44 are provided at the processing area 17 and, when extended, limit the movement of an incoming workpiece carrier 30. The workpiece carrier 30 can be held in processing area 17 by means of gripping jaws 45 which can be extended and retracted through apertures in cover plate 28.

Additional stop pins 46, which are operable independently of the pins 44, are provided in front of a rest area which succeeds processing area 17 in the direction of travel, and are operable independently of the pins 44 so that the workpiece carrier 30a can be arrested until the next succeeding conveyor section is free. Alternatively, two identical stations 5 may be arranged in succession in the direction of travel and only the workpieces on alternating workpiece carriers may then be processed in each station whereas the workpiece which has been similarly processed in the preceding station or the workpiece which is to be similarly processed in the succeeding station is moved to the storage area 30a rather than the processing area 17. In case of an accumulation of workpiece carriers in a succeeding station, the stop pins 46 may also be extended so that the area 30a then serves as a buffer area. To facilitate the control, the pins 44, 46 may extend only into the clearance space between baseplate 16 and the workpiece carrier 30, which in that case is provided with downwardly protruding stops. If the pins 44, 46 are transversely offset from each other and suitable stops are provided on alternating workpiece carriers, the workpiece carriers of one set will be arrested only by the pins 44 and those of the other sets only by the pins 46.

The above-described controllable arresting or retaining means for the workpieces or workpiece carriers are provided in the conveying path outside the processing areas, e.g., at predetermined waiting areas and may be used to define buffer zones or for other control operations. In that case, two stations in which a longer residence time of the workpieces is required may be provided. Rather than arranging such stations in parallel, as has been described above, they may be arranged in succession. In that case, some of the arriving workpieces are permitted to skip the first station and are processed in the second station, possibly after intermediate storage. These control operations may be assisted by the controllable barriers or retaining means.

As will appear from the description of further features of the assembly line arrangement illustrated herein, it also comprises diverting, transfer, storage, feeding and withdrawing stations for workpieces or workpiece carriers and such stations may constitute individual conveyor sections in the conveying path. Diverting stations may be used to change the direction of the assembly line, for instance to adapt it to existing space conditions. By means of transfer stations, all or some of the workpieces moved in the assembly line may be withdrawn and transferred to other conveyors. In the manufacture of similar workpieces in a number of processing steps, only one or two of which are different, these different processing steps can be performed on parallel production line sections, and the workpieces may be subsequently conveyed on a common conveyor line, as before. Storage stations may be used as buffers and permit a performance of certain processing steps even off the production line, to provide a stock of preprocessed workpieces which can then be fed to the production line at certain points so that the highest possible production speed can be used in the "faster stations" of the production line. In this way, manual stations may be arranged off the production line and the manually processed workpieces may be kept in stock, e.g., in a magazine which can hold a plurality of workpieces or workpiece carriers and may constitute a section of the conveying path.

It has already been mentioned that the conveyor sections may be combined and assembled in various ways so that the course of the assembly line can be adapted to the requirements and space conditions. Parallel conveyor sections may be provided throughout the length or along part of the length of the assembly line. In a simplified embodiment, this is accomplished in that identical or different individual stations are placed back to back. Manual stations often require more space than automatic stations. To provide for elbow-room between manual stations, the same may be longitudinally offset at such parallel conveyor sections. Where assembling machines are used, a better utilization of space will be obtained in such case if each processing station is offset from the longitudinal center of that conveyor section, which can take up a plurality of workpiece carriers, as has been described above. In that case, machines disposed outside the conveyor sections of the individual stations can be mounted easily and additional machines or transfer means can be arranged more favorably between the two conveyor sections even when two identical or similar stations are arranged back to back.

In a different embodiment, each station comprises a conveyor section with two conveyor courses which are parallel and disposed one beside the other and provided with separately operable drive means and one of these conveyor courses may be the forward course and the other one the return course of the conveying path, or different processing means may be associated with the two conveyor courses in the same station so that the return course can also be utilized for assembling and/or processing operations because the speed can be individually controlled. In that case, too, only one conveyor course may be initially used for assembling and/or processing operations and additional stations may be gradually added adjacent to the return course. When certain stations which extend even across the return course contain assembling machines which are so large that additional stations cannot be provided adjacent to the return course, simpler conveyors, such as belt conveyors, may be used to return the workpiece carriers. Where parallel conveyor courses are provided, the plant will comprise a head station comprising a transverse conveyor for moving the workpieces and/or workpiece carriers from one conveyor course to the other.

Particularly where two parallel conveyor courses are provided and are both utlized for processing or assembling, the processing stations may also be offset from the longitudinal center of the station, as has been mentioned above in conjunction with a single conveyor course. In the present case, the processing stations are offset from the longitudinal center of the station in opposite directions so that a continuous processing deck is suitably provided and units associated with the several processing areas, such as assembling aids, processing machines, ejectors, etc. can be mounted on said deck between the conveyor courses.

In FIG. 3, end station 1 in the assembly line arrangement of FIG. 1 has been illustrated as a transfer station for transferring the workpiece carriers 30 from the conveyor course 14a to the conveyor course 13a by means of transverse slideway 47. In such an end station, conveyor section 13a, 14a extends from one end of the working station to the transfer slideway functionally forming the other end of the station. Each workpiece carrier 30b arriving at slideway 47 actuates switch 48 which first causes clamping members 45 to be actuated so that the next workpiece carrier 30 is retained in a waiting position. The stop switch 48 then initiates the operation of a pneumatically or hydraulically actuated pusher 49 which pushes the workpiece carrier 30b along the transverse slideway 47 to the opposite end thereof until it engages and actuates switch 50 provided at that end to cause the return of pusher 49 to its initial position and to initiate the operation of another pusher 51. The latter then moves the workpiece 30b to the right until it can be engaged by the first pair of friction rollers 27 and can be moved thereby along the conveyor course 13a. The pusher 51 subsequently returns to its initial position. Upon release from clamping members 45, workpiece carrier 30 is moved to the stop switch 48 by the workpiece carrier arriving next.

The station 8 shown in FIG. 4 comprises stop pins 52 which are actuated to arrest the workpiece carrier 30 in the processing area 19. The pins 52 may also constitute sensors which, in response to the impact of a workpiece carrier, initiate the operation of clamping members 53 which are moved through apertures in the cover plate 28 to bear on carrier guide ribs 31 so that the elevation of the workpiece carrier 30 is exactly controlled. To ensure an exact alignment of the workpiece carrier 30 and of the workpiece held by it in the processing area, the clamping members 53 are provided in their intermediate portion with face serrations at 45° in mesh with mating serrations on the ribs 31 so that a full engagement will ensure an exact alignment in the transverse and longitudinal directions. Because the elevation is controlled by the clamping action, the workpiece is definitely positioned. Other aligning aids may be used, e.g., in the form of notches or bores, and may cooperate with mating portions of the clamping members, or aligning tools may be provided, which are operable jointly with the clamping members. The above-mentioned face serrations are provided in an inwardly offset intermediate portion of the guide ribs.

In stations comprising two conveying path courses 13, 14, each course has associated with it a separate drive motor, which is separately controlled and may be reversible.

In addition to the transfer station as shown in FIG. 3, which may be used also at stations 3 and 11, if required, it is possible to provide diverting stations, in which the workpiece carriers can be turned through a certain angle, e.g., of 90° so that a production line may be angled once or several times and can thus be adapted to space conditions or transport routes.

FIG. 6 shows a station which comprises two conveyor courses 13b, 14b and processing areas 54, 55 which are offset toward opposite ends of the conveyor courses 13b, 14b. The processing deck 56 between the conveyor courses 13b, 14b is wider than in the embodiments described hereinbefore. In these units, the spacing of the conveyor course 13b, 14b is larger than in the above-described stations having parallel conveyor courses. For this reason, units 57, 58, such as pushers or feeders, which are associated with the processing areas 54, 55, can be mounted on the deck 56 or even a transfer device may be provided, which moves the workpiece carriers 30 from one conveyor course into another, e.g., from course 13b to course 14b, and vice versa. In any case, the offset arrangement of the processing areas 54, 55 permits the processing means 57, 58 to be mounted one beside the other on the deck 56.

Each of the two processing areas 54, 55 has associated with it an additional unit 59, 60, which is disposed on the outside and may consist, for example, of a disentangling device succeeded by a feeder for single parts to be assembled, or of a spot-welding machine, a marking machine or another assembling, joining or sorting machine.

In an assembling plant having two parallel conveying paths, stations having only one conveyor course may be arranged in pairs so that the processing means are arranged back to back and the processing areas are offset from the longitudinal center of the respective station and the arrangement of the conveyor courses is similar to that of conveyor courses 13b, 14b. This offset arrangement also facilitates the arrangement of assembling aids and processing devices.

As will be obvious from the above description of preferred embodiments of the assembly line arrangement of this invention, smaller workpieces may be handled together with conforming inserts. A workpiece carrier may comprise a body which has the required strength and carries the guide ribs and aligning aids. That body may be made of metal, for example, and may constitute a holder for the workpiece or for an insert which conforms to and receives the workpiece. The insert may be molded from plastics material. The insert may even constitute a base part of a final package for the workpiece. Where small workpieces are to be handled, the insert may have a plurality or receptacles for the workpieces.

It has already been mentioned that an assembly line arrangement according to the invention may be controlled to perform identical operations at different positions or, in the processing of similar workpieces, to perform identical operations at identical locations and different operations at different locations. To enable a high degree of automation, the workpieces themselves or the workpiece carriers are suitably marked to indicate the processed or assembled state of the workpieces or the next prescribed waiting or assembling area in the conveying path. That area may also be a diverting station or a withdrawing station. The workpiece carrier may be provided with adjustable indicators, such as stop pins, which are adapted to be inserted into one of a plurality of receiving openings, or magnetizable inserts or adjustable marks, which cooperate with light barriers, and the succeeding stations in the direction of travel may be provided with sensors, stops or stop switches which cooperate with these indicators and may possibly be controlled by them.

Particularly smaller workpieces may be handled together with workpiece carriers and/or inserts which can be stacked together with the workpieces so that they can be stored in a magazine more easily.

Processing and assembling machines and equipment provided in the working stations have not been shown because the equipment in each station will be selected in view of the assembling and processing requirements. In preferred embodiments, the baseplate is provided with mounting openings at predetermined positions outside the conveyor sections and the devices or machines to be mounted are provided with mounting openings in a corresponding arrangement or with bolts or projections which can be inserted in the mounting openings in the baseplate 16. This design permits station baseplates to be manufactured in series and to be provided each with the equipment which is required. The return course conveyor sections may be disposed above or below the forward course conveyor sections.

What is claimed is:

1. An assembly line arrangement defining a linear conveying path for successive workpieces or workpiece carriers, which comprises a succession of replaceable in-line working stations, each working station having a conveyor section extending substantially from one end to the other end of the working station, and the conveyor sections of successive ones of the in-line working stations being arranged end-to-end in series to constitute the conveying path, the conveyor section of each working station having a succession of areas each of which accommodates a respective one of the workpieces or workpiece carriers and at least one of the successive areas being a waiting area and at least one other one of the areas being a processing area for working on the respective workpiece, and each conveyor section including guide means for vertically and laterally guiding the successive workpieces or workpiece carriers along the conveying path, the guide means being arranged to provide access to the workpieces or workpiece carriers in the processing area from below, and discrete friction drive rollers spaced along, and separate from the guide means, the drive rollers being dimensioned and operable for individually driving each workpiece or workpiece carrier independently through the conveyor section and being so spaced along the guide means that the processing area is free of drive rollers, the guide means of each conveyor section of a respective one of the in-line working stations extending substantially to the functional ends of the working stations and being arranged to provide a continuous planar conveying path between the working stations and along the entire assembly line arrangement for securely holding the successive workpieces or workpiece carriers.

2. The assembly line arrangement of claim 1, wherein the workpieces or workpiece carriers have longitudinal planar portions extending in the direction of the conveying path, the guide means comprises slideways arranged to cooperate with selected ones of the longitudinal planar portions and the friction rollers are mounted for pressure contact and frictional driving engagement with selected ones of the planar portions.

3. The assembly line arrangement of claim 2, wherein the workpiece carriers have guide ribs forming the longitudinal planar portions, the slideways are constituted by guide bars defining longitudinally extending guide grooves facing each other and receiving the guide ribs of the carriers, the guide bars having bottom walls defining vertical passages longitudinally spaced from each other, and the friction rollers are journaled in said passages and are mounted in the guide grooves.

4. The assembly line arrangement of claim 3, further comprising low-friction linings on the bottom walls of the guide bars in engagement with the guide ribs of the carriers.

5. The assembly line arrangement of claim 1, comprising torque-limiting friction clutches for the friction rollers and means for adjusting the torque limit of the clutches.

6. The assembly line arrangement of claim 5, further comprising uprights shafts, each friction roller being nonrotatably connected to a respective ones of the upright shafts and the shafts being arranged to be driven by respective ones of the friction clutches, a plurality of toothed belt and pulley means rotatably mounted on each one of the shafts and operable to drive the respective friction clutch, a common drive motor, and toothed belt and pulley means for operatively interconnecting the toothed belt and pulley means of all the shafts and for connection to the drive motor.

7. The assembly line arrangement of claim 6, wherein each friction clutch comprises a friction facing, a spring urging the toothed belt and pulley means against the friction facing, and screw means associated with the spring and operable to adjust the bias thereof.

8. The assembly line arrangement of claim 1, wherein the waiting area constitutes a storage area adapted to accommodate a plurality of successive ones of the workpieces or workpiece carriers.

9. The assembly line arrangement of claim 1, wherein the waiting area precedes the processing area in the direction of conveyance along said path.

10. The assembly line arrangement of claim 1, wherein the waiting area succeeds the processing area in the direction of conveyance along said path.

11. The assembly line arrangement of claim 1, further comprising controlled arresting means for stopping respective ones of the workpieces or workpiece carriers along said path in an area other than the processing area.

12. The assembly line arrangement of claim 11, wherein the arresting means is arranged to stop the respective workpiece or workpiece carrier in the waiting area.

13. The assembly line arrangement of claim 1, further comprising control means for the drive rollers on each one of the working stations for independently operating and controlling the drive rollers of each station.

* * * * *